United States Patent Office.

ELIZA D. MURFEY, OF NEW YORK, N. Y., ASSIGNOR TO THE MANHATTAN PACKING MANUFACTURING COMPANY, OF SAME PLACE.

Letters Patent No. 110,582, dated December 27, 1870.

IMPROVEMENT IN MATERIALS FOR BEARINGS AND PACKINGS.

The Schedule referred to in these Letters Patent and making part of the same.

I, ELIZA D. MURFEY, of New York, county of New York, State of New York, have invented an Improvement in Bearings and Packings, of which the following is a specification.

Nature and Object of the Invention.

My invention consists of rubber or other gum, combined with plumbago or soapstone, or other suitable substance or composition, to form a material which may be used alone or in connection with other substances as a substitute for metallic bearings and packings.

General Description.

Gutta-percha, or India rubber and powdered plumbago or soapstone, or a composition containing plumbago, soapstone, or equivalent substance, are thoroughly combined, in the proportion of about one part of gum to each two parts of the powdered material.

These substances combined will form a hard, tough, durable, and slightly-elastic material, which, by friction, will acquire an extremely smooth surface, and, when molded or cut to the proper form, will serve as an efficient substitute for the usual packings for joints, piston-rods, &c., or as a bearing material; or it may be ground or otherwise comminuted, and applied as a powder; or, combined with balsam or its equivalent, as a paste to coat or impregnate fibrous materials or sheets to be used for bearings and packings.

Various processes may be employed to effect the intimate and thorough mixture of the gum and powder. One mode which I have employed is to dissolve the gum by heat, add a portion of the powder, knead and work the mixture until cold, then re-heat and add additional powder, repeating these operations until the desired mixture is obtained.

Instead of this process the powder may be added to a solution of the gum in a suitable solvent, the latter being afterward wholly or partially removed.

In carrying this process into effect one part of gum is dissolved in hot glycerine, melted paraffine, tallow, or other suitable liquid, the solution being constantly agitated by blades which beat the whole to a froth. After the gum is completely dissolved the powdered material is added, and the whole is worked until the ingredients are thoroughly and uniformly combined, when, if necessary, the solvent may be expelled by continued heat and pressure or otherwise.

Instead of using dissolved rubber, what is known as rubber-sponge may be impregnated with the powdered material by the use of water or other liquid as a vehicle for carrying the powder among the interstices of the sponge, the vehicle being subsequently expelled.

Claims.

1. A bearing or packing material consisting of gum and plumbago, or other powder, combined.
2. The said material condensed or molded, as set forth.
3. A powder or paste for impregnating or coating strands, &c., consisting of gum and powder, and prepared as specified.

In testimony whereof I have signed my name to this specification in the presence of two subscribing witnesses.

ELIZA D. MURFEY.

Witnesses:
THOMAS PRUDEN,
LEON GEHR.